Oct. 10, 1939.     R. C. RIKE     2,175,447
HYDRAULIC BRAKE
Filed Aug. 23, 1937
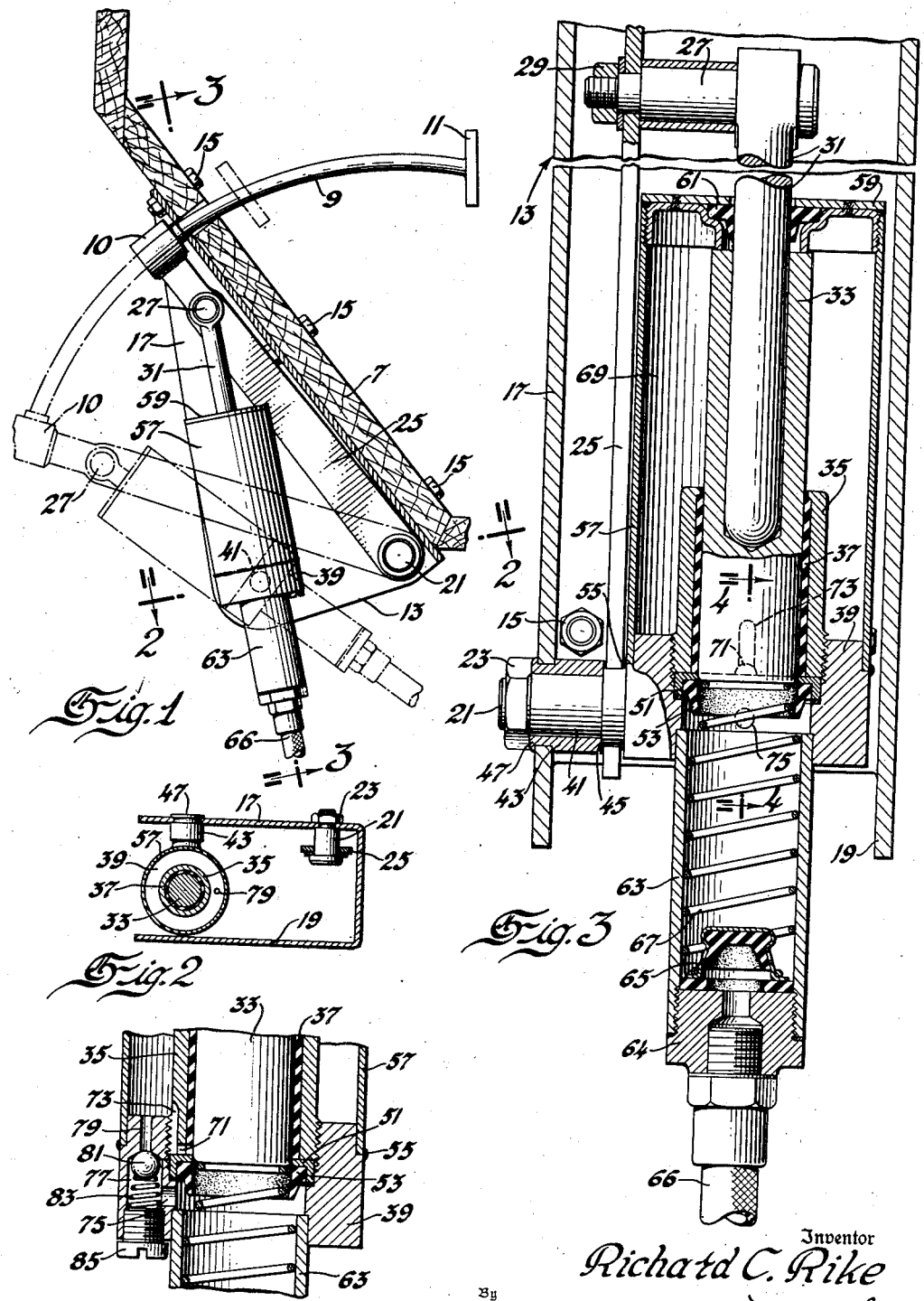
Inventor
Richard C. Rike
By
Blackmore, Spencer & Flint
Attorneys Patented Oct. 10, 1939

2,175,447

UNITED STATES PATENT OFFICE 2,175,447

HYDRAULIC BRAKE

Richard C. Rike, Dayton, Ohio, assignor to General Motors Corporation, Detroit, Mich., a corporation of Delaware Application August 23, 1937, Serial No. 160,388

3 Claims. (Cl. 188—152)

This invention relates to brakes and particularly to hydraulic operating mechanism by means of which fluid is transmitted from a master cylinder for applying the brakes at the wheels of the vehicle.

An object of the invention is an improved master cylinder and installation thereof.

A further object is to provide a master cylinder assembly wherein a progressive mechanical advantage is provided.

A still further object is the provision of a master cylinder assembly wherein the pedal is associated therewith in a way to utilize the first part of the pedal movement to take up brake shoe clearance, the pedal thereafter acting with an increasing mechanical advantage to supply the greater force necessary to retard the rotation of the drum engaged by the shoes.

Among other objects are efficiency in operation and economy in manufacture.

Still other objects will be appreciated from the following description.

In the accompanying drawing:

Figure 1 is a view in elevation of the assembly including the master cylinder and the operating parts associated therewith.

Figure 2 is a section on line 2—2 of Figure 1.
Figure 3 is a section on line 3—3 of Figure 1.
Figure 4 is a section on line 4—4 of Figure 3.

Referring by reference characters to the drawing the floor board of a motor vehicle is represented by numeral 7 and at 9 is seen a curved rod terminating in a foot pad 11. The parts 9 and 11 constitute a pedal for applying the brake. Beneath the floor board 7 is a channel-shaped bracket 13, the base of which is secured by suitable fastening means 15. The side walls 17 and 19 of the bracket are of triangular shape as shown by Figure 1. A shouldered pivot bolt 21 extends through wall 17 and is held in position by a nut 23. Pivoted on this bolt is an arm 25. To the end of the arm is secured the end of the arcuate rod 9 as at 10. To arm 25 at a point near its connection with the curved rod 9 is a shouldered pivot 27 secured thereto by a nut 29. A piston rod 31 is rotatably supported by pivot 27. Piston rod 31 is slidably mounted in a piston 33 reciprocable within a cylinder 35. The latter may have a liner of rubber or the like 37 to serve to centralize the piston. The cylinder 35 is threaded into a cross head 39, the latter having a trunnion 41 extending through wall 17. The trunnion is surrounded by a spacing collar 43 engaging the wall 17 and a shoulder 45 on the trunnion. The collar 43 is terminally crimped over to engage the outer face of wall 17 as shown at 47.

A cup 51 is located within the cross head and in contact with the end of cylinder 35. When the piston 33 slides through the cup it is sealed by a rubber seal 53 positioned therein. Fastened at 55 to the marginal wall of the cross head is a larger cylinder 57 surrounding cylinder 35 and piston 33. A closure 59 is secured to the upper end of cylinder 57. This closure is apertured for the passage of piston rod 31 and carries a suitable sealing device 61.

At 63 is another cylinder secured to the cross head and in axial alignment with cylinder 35. Its lower end is threaded and to it is secured an apertured closure 64 to which a conventional conduit 66 is attached. If so desired a valve construction represented as a whole by numeral 65 and for which no invention is herein claimed, may be used at the end of cylinder 63. This valve opens to permit discharge of fluid from cylinder 63 and will open to admit a return of fluid to said cylinder when the pressure of said fluid is sufficient to overcome a spring 67, the spring engaging the valve at one end and the piston at its other end. The annular space between cylinders 57 and 35 serves as a fluid reservoir. One or more recesses 71 are cut in the end of cylinder 35 communicating by means of an axial channel 73 with the reservoir. This is best shown in Figure 4 where the piston is shown in a position where its movement is just about to close the communication between the reservoir and the interior of cylinder 63. Between the seal 53 and the top of cylinder 63 the cross head has a radial passage 75 communicating with an axial passage 77. This latter passage is in communication with the reservoir by means of a reduced passage 79 normally closed by a ball valve 81 seated by a spring 83 held in abutment with a removable plug 85. Figure 4 shows the piston in its retracted position. When it advances it moves through seal 53 and reduces the capacity of cylinder 63. It thus forces fluid out from said cylinder 63 into the conduit 66 by means of which the brakes are applied in the usual way. In doing so, sufficient pressure is built up in cylinder 63 to supplement the action of spring 83 and hold ball valve 81 closed. Also the first movement of the piston fully closes the communication between the reservoir and the cylinder by ways of passages 71 and 73. When the piston returns after brake application the tendency of suction to develop in cylinder 63, if the piston 33 returns faster than the brake shoe retraction spring restores fluid to this cylinder, is overcome by passage of fluid from the reservoir entering the cylinder 63 by way of valve 81. When the piston 33 is fully retracted any excess of fluid delivered to the cylinder 63 by the completion of the return flow may reach the reservoir by way of passages 71 and 73.

The full lines of Figure 1 show the mechanism in brake released position. The dotted lines represent the parts in brake applied position. The arrangement is such that for equal increments of pedal depression the corresponding axial movements of the piston progressively decrease. In consequence the brake shoe clearances are quickly taken up, the pedal acting with a relatively low mechanical advantage. By the time that the shoes engage the drum and when greater forces are required to check the rotation of the drum the parts have assumed positions where the movement of the piston is very slight for the corresponding movement of the pedal and the pedal thus acts with a high mechanical advantage. In consequence, no great effort is required to secure effective braking action. It will be appreciated that the pinion trunnion 41 may be located as desired relative to pin 21 to secure just the kind of mechanical advantage desired.

I claim:

1. For use with a hydraulic operating system, a master cylinder, a pedal spaced pivots for said cylinder and pedal, said cylinder having a piston rod reciprocable therein, and pivot means directly connecting said piston rod and pedal and said pivot means being movable in response to movement of said pedal toward a position of alignment with said pivots.

2. In hydraulic operating means for vehicle brakes, a bracket fixed to said vehicle, a lever provided with a pad, the lever and pad constituting a pedal, a pivot between said lever and bracket, a master cylinder having a piston, a second and spaced pivot whereby said master cylinder is pivoted to said bracket, pivot means directly connecting said lever and piston of said master cylinder, said pivot means being movable about the pivotal center of the lever, along the axis of the piston rod and toward a position of alignment with said pivots, the location of said spaced pivots being such as to give said pedal a variable mechanical advantage in projecting said piston into said cylinder.

3. For use with a hydraulic operating system, a master cylinder, a manually operable member, spaced pivots for said cylinder and member, said cylinder having a piston rod reciprocable therein, and pivot means directly connecting said piston rod and said member, said pivot means being movable in response to movement of said member toward a position of aligment with said pivots, together with a reservoir of annular form secured to and in co-axial relation with said master cylinder, said piston rod extending through said reservoir.

RICHARD C. RIKE.